United States Patent
Kawakita et al.

(10) Patent No.: US 7,827,960 B2
(45) Date of Patent: Nov. 9, 2010

(54) CONTROLLER OF ENGINE

(75) Inventors: Koji Kawakita, Ohbu (JP); Katsunori Ueda, Okazaki (JP); Toshiyuki Miyata, Okazaki (JP); Hiroki Yamamoto, Nagoya (JP)

(73) Assignee: Mitsubishi Jidosha Kogyo Kabushiki Kaisha, Tokyo (JP)

( * ) Notice: Subject to any disclaimer, the term of this patent is extended or adjusted under 35 U.S.C. 154(b) by 31 days.

(21) Appl. No.: 12/370,053

(22) Filed: Feb. 12, 2009

(65) Prior Publication Data
US 2009/0205613 A1 Aug. 20, 2009

(30) Foreign Application Priority Data
Feb. 13, 2008 (JP) .............................. 2008-031277

(51) Int. Cl.
*F02P 5/15* (2006.01)
(52) U.S. Cl. ........................... 123/406.31; 123/406.46; 123/406.47
(58) Field of Classification Search ................. 123/1 A, 123/406.31, 406.46, 406.47
See application file for complete search history.

(56) References Cited

U.S. PATENT DOCUMENTS

| | | | | |
|---|---|---|---|---|
| 4,408,582 A * | 10/1983 | Merrick | ................. | 123/406.46 |
| 4,993,386 A * | 2/1991 | Ozasa et al. | ................. | 123/25 J |
| 5,050,555 A * | 9/1991 | Mitsumoto | ............. | 123/406.31 |
| 5,233,959 A * | 8/1993 | Kojima | ................... | 123/406.55 |
| 7,581,528 B2 * | 9/2009 | Stein et al. | ................... | 123/431 |
| 2006/0102146 A1* | 5/2006 | Cohn et al. | ............. | 123/406.29 |

FOREIGN PATENT DOCUMENTS

JP 5-33748 A 2/1993

* cited by examiner

*Primary Examiner*—Erick Solis
(74) *Attorney, Agent, or Firm*—Birch, Stewart, Kolasch & Birch, LLP (57) ABSTRACT

A controller of an engine that can use a blended fuel with alcohol blended therein, the controller includes: an ignition timing controller, operable to control an ignition timing of the engine; an exhaust air-fuel ratio detector, operable to detect an exhaust air-fuel ratio of the engine; a concentration detector, operable to detect concentration of the alcohol in the blended fuel; an operation state detector, operable to detect an operation state of the engine; and a corrector, when the operation state which is detected by the operation state detector is a high-speed, high-load operation state, as the concentration of the alcohol which is detected by the concentration detector is higher, operable to control an injection amount which is injected from a fuel injection valve to correct a target equivalence ratio more in a lean direction, and operable to correct the ignition timing which is controlled by the ignition timing controller more to a spark advance side.

8 Claims, 12 Drawing Sheets

CONTROLLER OF ENGINE

BACKGROUND OF THE INVENTION

The present invention relates to a controller of an engine that can use a blended fuel with alcohol blended therein.

Although generally, gasoline is used as a fuel in an engine of an automobile or other vehicle, a blended fuel with alcohol blended therein can also be used. For example, there is a vehicle (FFV: Flexible Fuel Vehicle) equipped with an engine that can use a blended fuel in which alcohol is blended at any proportion (0% to 100%).

An alcohol concentration of a blended fuel supplied to such an engine for FFV is not necessarily constantly fixed. The alcohol concentration of the blended fuel supplied to the engine changes according to the alcohol concentration of the blended fuel supplied as fuel and the fuel supplying amount. Also, alcohol is higher in octane number than gasoline, and the octane number of the blended fuel changes according to the alcohol concentration. An air-fuel ratio, ignition timing, etc., must thus be adjusted appropriately according to the alcohol concentration in the blended fuel. For example, there is a configuration where, when, during low speed rotation of the engine, the alcohol concentration of the blended fuel (fuel used) is high, the ignition timing is corrected to a spark advance side, and when, during high speed rotation of the engine, the alcohol concentration of the blended fuel is high, the ignition timing is corrected to a spark retardation side (see, for example, JP-A-5-33748).

As described above, when, during high speed rotation engine, the alcohol concentration of the blended fuel is high, it may be possible to prevent knocking by correcting the ignition timing to the spark retardation side. However, this causes an engine output to decrease. Also, when the ignition timing is corrected to the spark retardation side, an exhaust temperature rises and this may cause heat damage of an exhaust system.

Because the alcohol used as fuel is approximately ⅔ in energy density in comparison to gasoline, to obtain an equivalence ratio substantially equal to that in a case of using gasoline when a blended fuel of comparatively high alcohol concentration (for example, a blended fuel having alcohol blended at a proportion of 85%) is used, a fuel injection amount from a fuel injection valve must be increased by up to approximately 1.5 times. Thus, in a case where a fuel injection valve used in a gasoline engine is applied as it is to an engine using a blended fuel, when a large amount of fuel is to be injected, for example, in a high-speed, high-load state, a demanded injection amount may exceeds a maximum injection amount (limiting injection amount) of the fuel injection valve and a desired equivalence ratio may not be obtained. Though obviously this problem does not arise if a special fuel injection valve for blended fuel is used, since this leads to an increase in cost, it is desirable to use a fuel injection valve used in a gasoline engine.

SUMMARY

It is therefore an object of the invention to provide a controller of an engine which enables improvement in output and fuel consumption while preventing heat damage of an engine.

In order to achieve the object, according to the invention, there is provided a controller of an engine that can use a blended fuel with alcohol blended therein, the controller comprising:

an ignition timing controller, operable to control an ignition timing of the engine;

an exhaust air-fuel ratio detector, operable to detect an exhaust air-fuel ratio of the engine;

a concentration detector, operable to detect concentration of the alcohol in the blended fuel;

an operation state detector, operable to detect an operation state of the engine; and a corrector, when the operation state which is detected by the operation state detector is a high-speed, high-load operation state, as the concentration of the alcohol which is detected by the concentration detector is higher, operable to control an injection amount which is injected from a fuel injection valve to correct a target equivalence ratio more in a lean direction, and operable to correct the ignition timing which is controlled by the ignition timing controller more to a spark advance side.

When the operation state which is detected by the operation state detector is a high-speed, low-load operation state, as the concentration of the alcohol which is detected by the concentration detector is higher, the corrector may correct the target equivalence ratio more in the lean direction.

When the operation state which is detected by the operation state detector is a low-speed, high-load operation state, as the concentration of the alcohol which is detected by the concentration detector is higher, the corrector may correct the ignition timing more to the spark advance side.

The controller may further include: a limiter, when a demanded injection amount necessary for obtaining the target equivalence ratio is greater than a limiting injection amount of the fuel injection valve, operable to limit an opening of a throttle valve which is provided in an air intake system of the engine to a limit value.

The controller may further include: an intake air amount detector, operable to detect an intake air amount of the engine; a limiting injection amount calculator, operable to calculate the limiting injection amount based on the operation state which is detected by the operation state detector; and a demanded injection amount calculator, operable to calculate the demanded injection amount based on the intake amount which is detected by the intake air amount detector, the concentration of the alcohol which is detected by the concentration detector, and the target equivalence ratio.

The controller may further include: a limit value calculator, operable to calculate the limit value based on the limiting injection amount which is calculated by the limiting injection amount calculator, the concentration of the alcohol which is detected by the concentration detector, and the target equivalence ratio.

The controller may further include: an accelerator pedal opening detector, operable to detect an opening of an accelerator pedal; and a throttle valve controller, operable to control the throttle valve in accordance with the opening of the accelerator pedal. As the concentration of the alcohol which is detected by the concentration detector is higher, the throttle valve controller may limit an increase amount of the opening of the throttle valve more.

The concentration detector may detect the concentration of the alcohol in the blended fuel based on the exhaust air-fuel ratio which is detected by the exhaust air-fuel ratio detector.

DETAILED DESCRIPTION OF PREFERRED EMBODIMENTS

Figure 1:
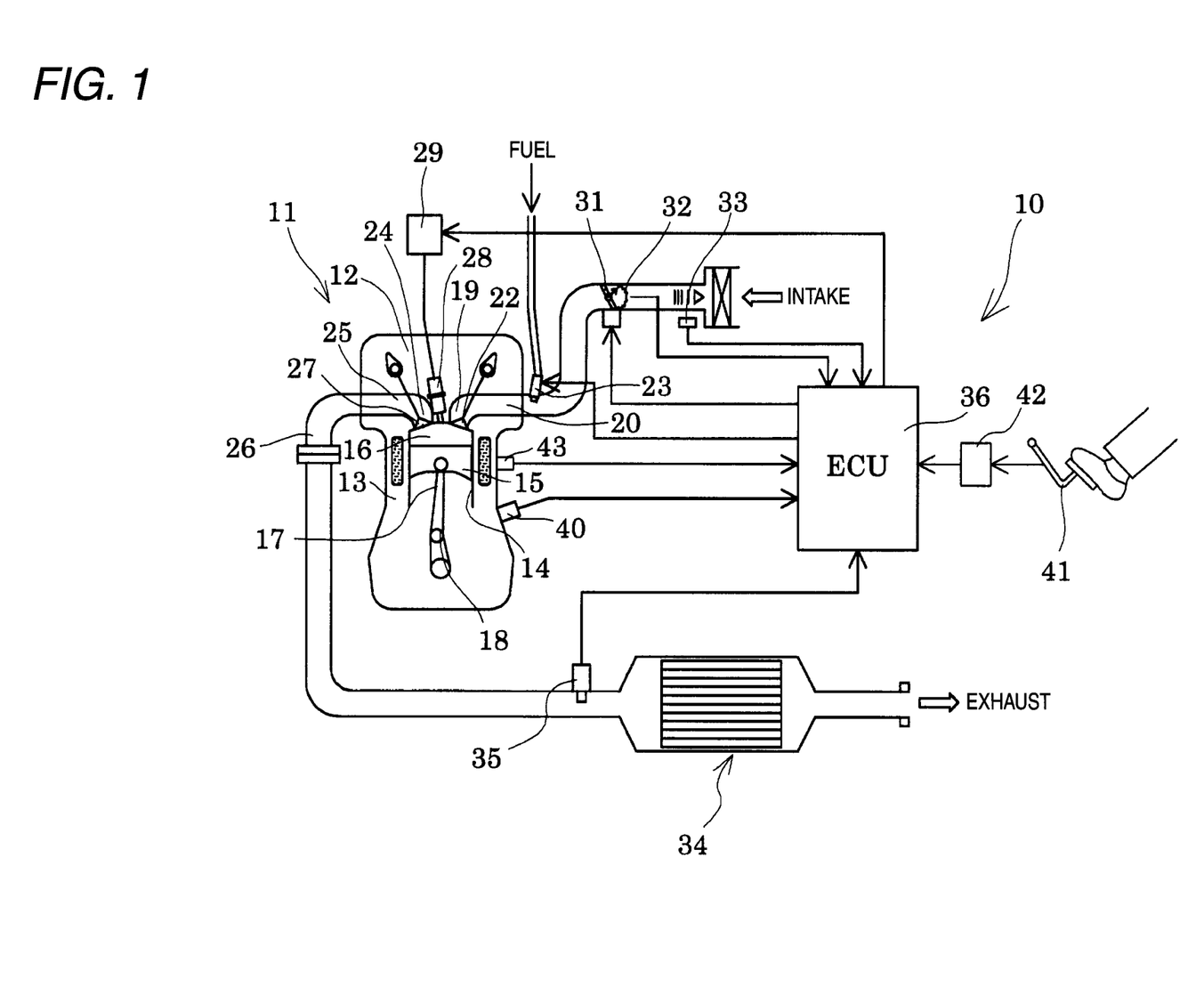
FIG. 1 is a schematic configuration diagram of an engine system including a controller according to an embodiment.

Hereinafter, an embodiment of the present invention shall be described with reference to the drawings. In the following, the present invention shall be described by way of an example of an engine system, including an engine using a blended fuel with alcohol blended therein and a controller for the engine. FIG. 1 is a schematic configuration diagram of the engine system including the controller according to the present invention.

The engine 11, shown in FIG. 1, is a multi point injection engine having a cylinder head 12 and a cylinder block 13. Inside each cylinder 14 of the cylinder block 13, a piston 15 is housed in a reciprocally movable manner. A combustion chamber 16 is formed by the piston 15, the cylinder 14, and the cylinder head 12. The piston 15 is connected to a crank shaft 18 via a connecting rod 17. The reciprocal movement of the piston 15 is transmitted to the crank shaft 18 via the connecting rod 17.

An intake port 19 is formed in the cylinder head 12. An intake manifold 20 is connected to the intake port 19. An intake valve 22 is disposed on the intake port 19, and the intake port 19 is opened and closed by the intake valve 22. A fuel injection valve 23, for example of a solenoid type, is disposed on the intake manifold 20, and although not illustrated, a fuel supplying device, having a fuel tank, is connected via a fuel valve to the fuel injection valve 23.

An exhaust port 24 is furthermore formed in the cylinder head 12. One end of an exhaust manifold 25 is connected to the exhaust port 24, and an exhaust pipe 26 is connected to the other end of the exhaust manifold 25. An exhaust valve 27 is disposed on the exhaust port 24, and as with the intake valve 22 on the intake port 19, the exhaust port 24 is opened and closed by the exhaust valve 27.

On the cylinder head 12, a spark plug 28 is mounted according to each cylinder. An ignition coil 29, outputting a high voltage, is connected to each spark plug 28. A throttle valve 31, adjusting an intake air amount, is disposed at an upstream side of the intake manifold 20 along with a throttle position sensor (TPS) 32 that detects an opening of the throttle valve 31. The opening of the throttle valve 31 is adjusted in linkage with an operation of an accelerator pedal.

An air flow sensor 33, measuring the intake air amount, is interposed upstream the throttle valve 31.

A ternary catalyst 34, which is an exhaust purifying catalyst, is interposed in the exhaust pipe 26 connected to the exhaust manifold 25. An $O_2$ sensor 35, detecting an oxygen concentration in an exhaust gas before passage through the catalyst, is disposed at an upstream side of the ternary catalyst 34. That is, an exhaust air-fuel ratio is detected based on output information of the $O_2$ sensor 35, and a fuel injection amount is feedback controlled according to the exhaust air-fuel ratio. Also with the present embodiment, an alcohol concentration of a blended fuel is detected (estimated) from the exhaust air-fuel ratio (concentration detector). In place of the $O_2$ sensor, a linear air-fuel ratio sensor (LAFS) may be disposed and the exhaust air-fuel ratio may be detected by the LAFS.

An ECU (Electronic Control Unit) 36 includes an input/output device, a memory device (ROM, RAM, etc.), a central processing unit (CPU), a timer counter, etc. By the ECU 36, comprehensive control of the engine 11 is performed. In addition to the throttle position sensor 32, the air flow sensor (operation state detector) 33, and the $O_2$ sensor 35, various sensors, including a crank angle sensor (operation state detector) 40, detecting a crank angle of the engine 11, an accelerator position sensor (accelerator pedal opening detector) 42, detecting an operation opening of the accelerator pedal 41, a water temperature sensor 43, detecting a water temperature of the engine 11, etc., are connected to and detection information from these sensors are input into an input side of the ECU 36.

Meanwhile, the fuel injection valve 23, the ignition coil 29, the throttle valve 31, and various other output devices are connected to an output side of the ECU 36. A fuel injection time, an ignition timing, a throttle opening, etc., are calculated by the ECU 36 based on the detection information from the various sensors and respectively output to the various output devices.

The controller 10 according to the present invention is constituted of the ECU 36 and the various abovementioned sensors, an appropriate target equivalence ratio is set based on the detection information from the various sensors, and so as to make an actual air-fuel ratio be equal to the target equivalence ratio, an appropriate amount of fuel is injected from the fuel injection valve 23 at an appropriate timing, a throttle valve 31 is adjusted to an appropriate opening, and spark ignition by the spark plug 28 is performed at an appropriate ignition timing.

As mentioned above, the engine 11 is installed in an FFV and uses a blended fuel with alcohol blended therein. As shall be described below, with the controller 10 according to the present invention, by appropriately setting various parameter values, such as the ignition timing, the target equivalence ratio, etch, according to an engine operation region and the alcohol concentration of the blended fuel supplied to the engine 11, an output and a fuel consumption of the engine 11 are improved.

Hereinafter, a method of controlling the engine 11 by means of the controller 10 shall be described in detail with reference to the drawings. Although the alcohol concentration of the blended fuel used in the engine 11 is not limited in particular, a commercially available blended fuel with the highest alcohol concentration is that with which the alcohol (ethanol) concentration is 85% (hereinafter, indicated as "blended fuel (E85)"). A fuel of the lowest alcohol concentration is a fuel of 0% alcohol concentration (hereinafter, indicated as "fuel (E0)"), in other words, gasoline. It shall thus be deemed that with the blended fuel used in the engine 11 of the present example, the alcohol concentration varies in a range of 0 to 85%.

Figure 2:
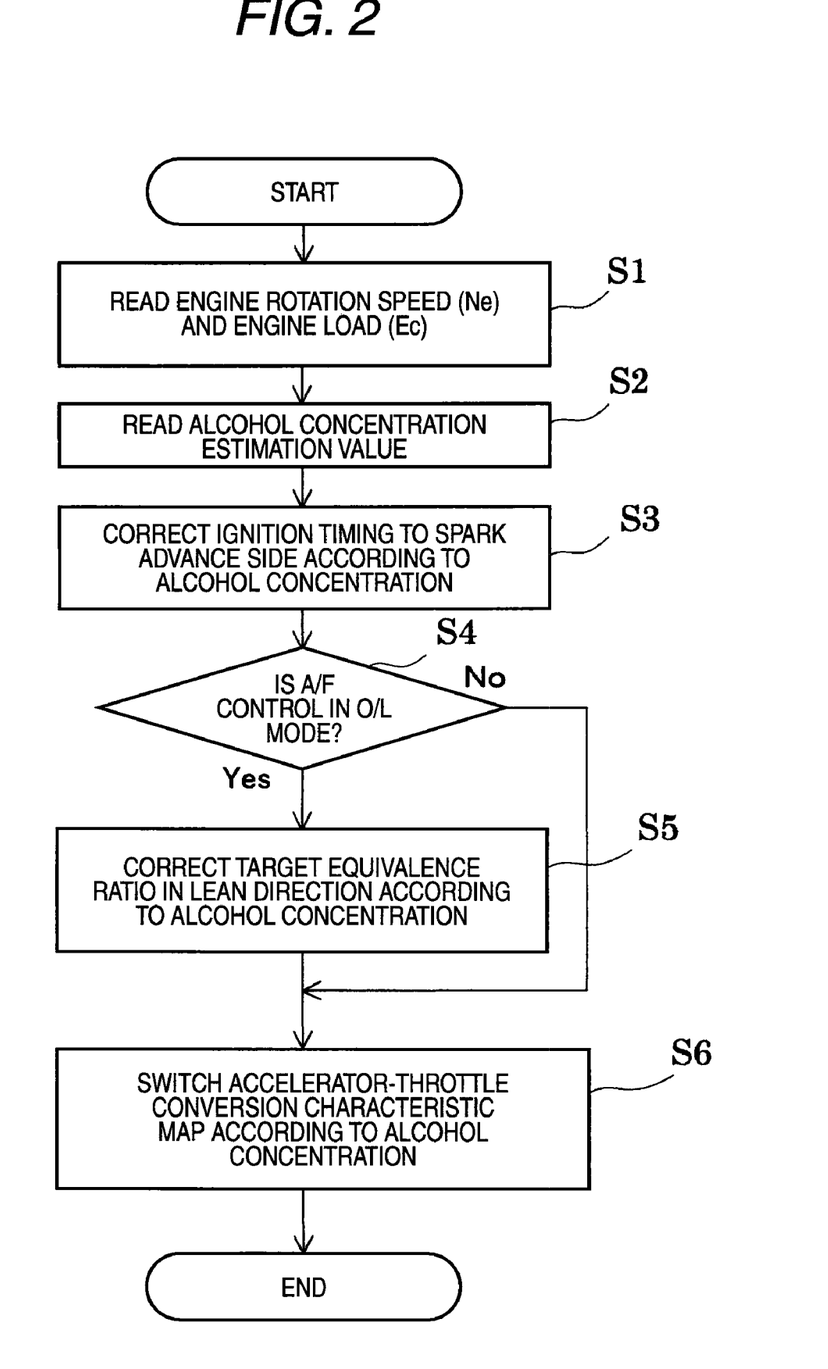
FIG. 2 is a flowchart of an example of a method of controlling an engine by means of the controller according to the present invention.

FIG. 2 is a flowchart of an example of a method of controlling an engine by means of the controller according to the present embodiment. As shown in FIG. 2, first in step S1, an engine rotation speed (Ne) is read from an output of the crank angle sensor 40, and an engine load (Ec) is read from an output of the air flow sensor 33. Next in step S2, the alcohol concentration in the blended fuel used in the engine 11 is detected (concentration detector). With the controller 10 according to the present embodiment, the alcohol concentration in the blended fuel is detected (estimated), for example, based on the exhaust air-fuel ratio detected by the $O_2$ sensor 35, etc., at a predetermined timing, the detection value is memorized, and in step S2, the alcohol concentration estimation value memorized last is read. Needless to say, the alcohol concentration of the blended fuel may be detected (estimated) each time. Also, although with the present embodiment, the alcohol concentration of the blended fuel is estimated, for example, the alcohol concentration of the blended fuel inside the fuel tank may be detected directly.

Figure 3:
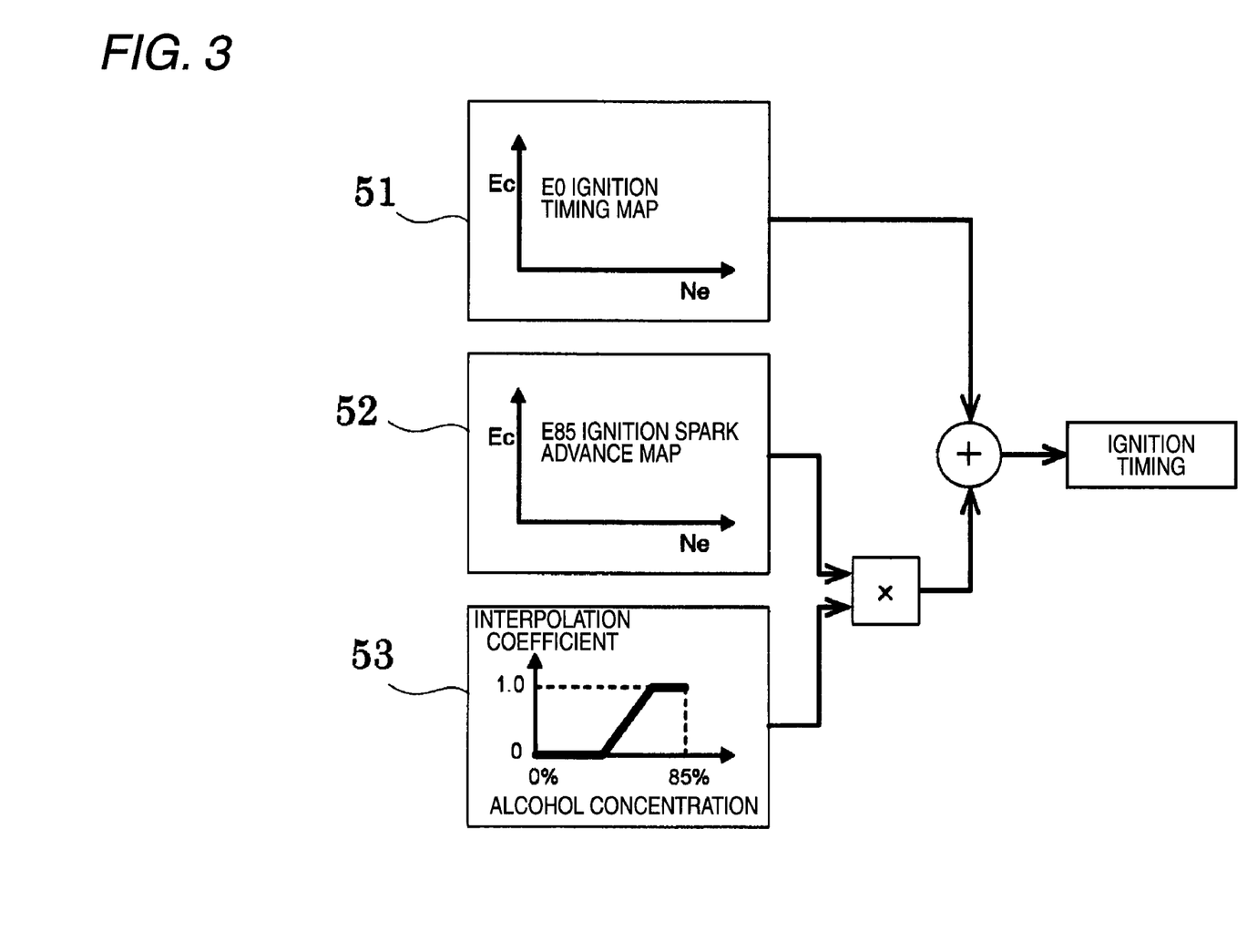
FIG. 3 is a schematic diagram for describing an ignition timing calculating procedure.

Next in step S3, various maps are referenced, and based on the read engine load (Ec) and the alcohol concentration estimation value, the ignition timing is corrected more to a spark advance side as the alcohol concentration is higher if the engine is in a high-load operation state (corrector). For example, with the present embodiment, the ignition timing that is optimal for the alcohol concentration in the blended fuel is calculated, as shown in FIG. 3, from a fuel (E0) usage ignition timing map (E0 ignition timing map) 51, indicated by a relationship between the engine rotation speed (Ne) and the load (Ec), a blended fuel (E85) usage spark advance map (E85 spark advance map) 52, indicated by a relationship between the engine rotation speed and the load, and an interpolation coefficient map 53 for interpolation with respect to the alcohol concentration. That is, the ignition timing that is optimal for the alcohol concentration in the blended fuel is calculated by adding a product, resulting from multiplication of a spark advance amount, acquired from the E85 spark advance map 52, and an interpolation coefficient, acquired from the map 53, to an ignition timing, acquired from the E0 ignition timing map 51. The ignition timing is then corrected to the spark advance side according to the calculation result (corrector).

Next in step S4, it is determined whether or not A/F control is in an open loop (O/L) mode, and if the A/F control is in the O/L mode (step S4: Yes), the target equivalence ratio is corrected more in a lean direction as the alcohol concentration in the blended fuel is higher in step S5 (corrector). On the other hand, if the A/F control is not in the O/L mode but is in feedback (F/B) control (step S4: No), because, for example, the air-fuel ratio is controlled based on the exhaust A/F, the control in step S5 is not performed and step S6 is entered.

Figure 4:
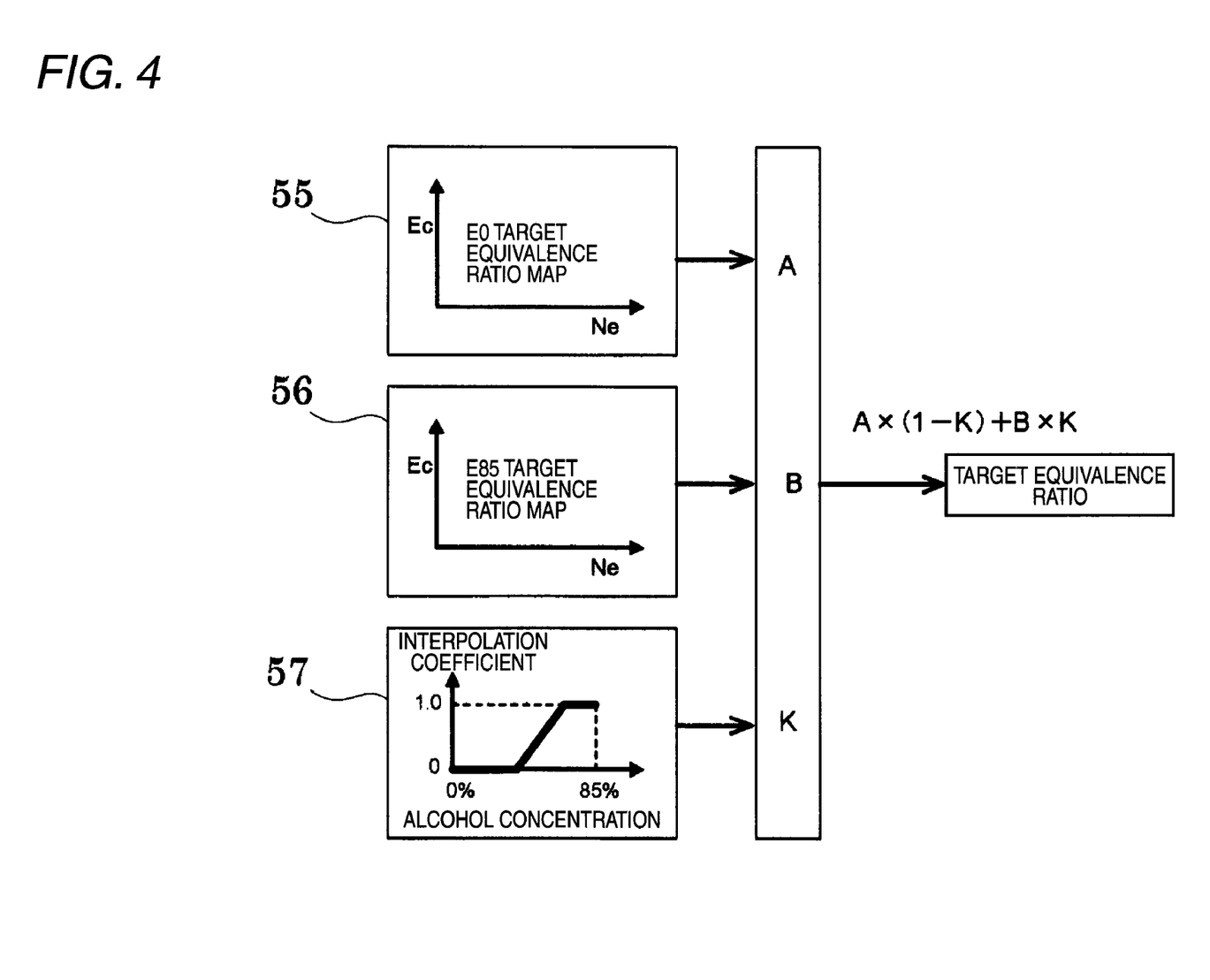
FIG. 4 is a schematic diagram for describing a leaned target equivalence ratio calculating procedure.

In step S5, various maps are referenced, and if the engine is in a high-speed operation state and the alcohol concentration is high, the target equivalence ratio is corrected in a lean direction. For example, with the present embodiment, a target equivalence ratio that is corrected in the lean direction is calculated, as shown in FIG. 4, from a fuel (E0) usage target equivalence ratio map (E0 target equivalence ratio map) 55, a blended fuel (E85) usage target equivalence ratio map (E85 target equivalence ratio map) 56, and an interpolation coefficient map 57 for interpolation with respect to the alcohol concentration in the blended fuel. That is, from a target equivalence ratio, acquired from the E0 target equivalence ratio map 55, that is specifically, a target equivalence ratio A in accordance with the engine operation state (engine rotation speed and load) at the present time, a target equivalence ratio, acquired from the E85 target equivalence ratio map 56, that is specifically, a target equivalence ratio B in accordance with the engine operation state (engine rotation speed and load) at the present time, and an interpolation coefficient K, acquired from the interpolation coefficient map 57 in accordance with the alcohol concentration in the blended fuel, the target equivalence ratio corrected in the lean direction is calculated using the following Formula (1):

[Numerical Formula 1]

$$A \times (1-K) + B \times K \qquad (1)$$

By thus correcting the ignition timing to the spark advance side and leaning the target equivalence ratio according to the alcohol concentration of the blended fuel when the engine is in a high-speed, high-load operation state, the output and the fuel consumption can be improved and damage of the engine due to rise of an exhaust temperature can also be prevented.

In the case of a gasoline engine, during high-speed, high-load operation, the target equivalence ratio is made strongly rich to suppress the exhaust temperature in consideration of heat damage of the exhaust system. Meanwhile, in a case where an alcohol-blended fuel is used, because knocking becomes less likely to occur (an octane number is high) and the exhaust temperature becomes low (a latent heat of vaporization is high), spark advancing of the ignition timing and leaning of the target equivalence ratio become enabled.

Figure 5:
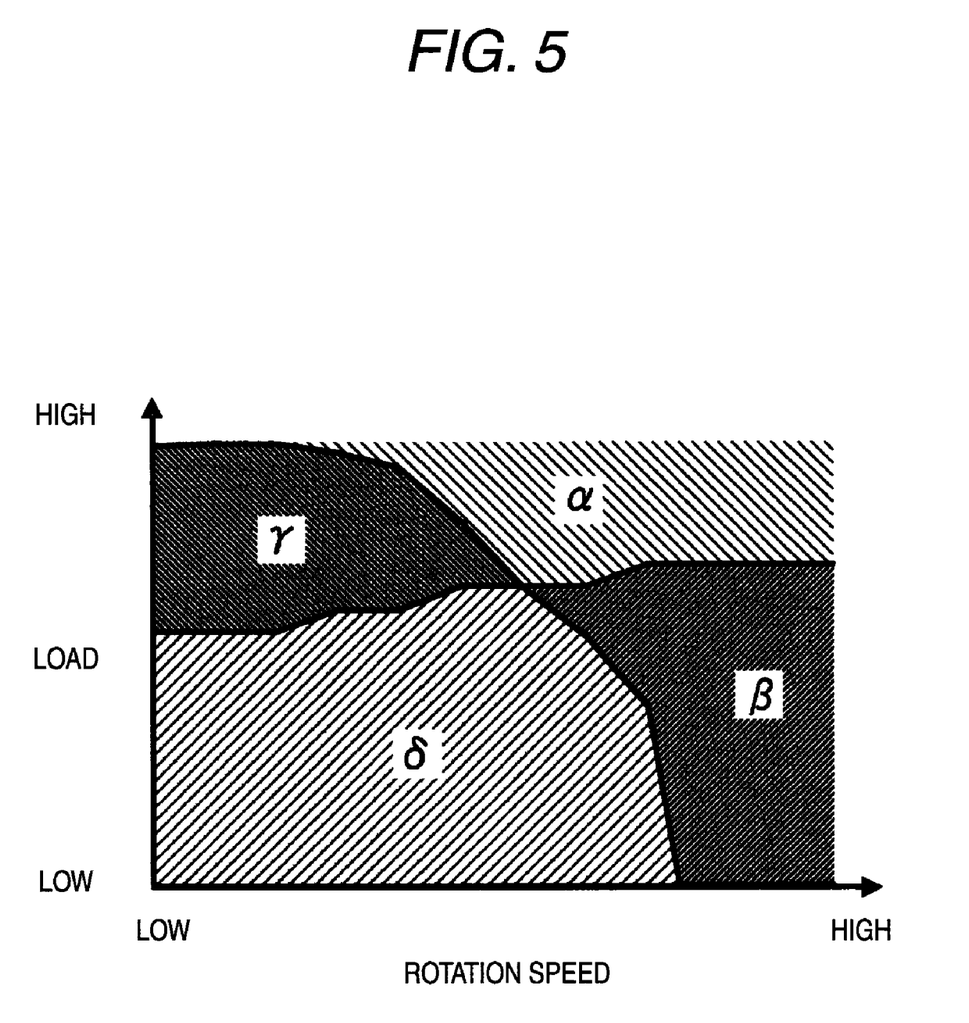
FIG. 5 is a graph of an example of regions of performing ignition timing spark advancing and target equivalence ratio leaning corrections.

As mentioned above, the spark advancing of the ignition timing and the leaning of the target equivalence ratio are carried out in accordance with regions indicated by relationships of the engine rotation speed (Ne) and load (Ec) (see the respective maps 51, 52, 55, and 56 in FIGS. 3 and 4). The region in which spark advance correction of the ignition timing is performed is set based on a region in which it can be estimated that an optimal ignition timing (MBT) cannot be set when the fuel (E0) is used (that is, a region in which knocking occurs readily when E0 is used). The region in which leaning correction of the target equivalence ratio is performed is set based on a region in which it can be assumed that enriching without feedback control is necessary in consideration of a heat resistance limit of the exhaust system (exhaust port 24—exhaust manifold 25—exhaust pipe 26) when the fuel (E0) is used. In the present embodiment, the regions for performing these corrections are set as shown in FIG. 5.

In detail:

(1) In a high-speed, high-load operation region a, where the engine rotation speed and load are both high, both ignition timing spark advancing and target equivalence ratio leaning corrections are carried out.

(2) In a high-speed, low-load operation region p, where the engine rotation speed is high and the load is low, only target equivalence ratio leaning correction is carried out.

(3) In a low-speed, high-load operation region y, where the engine rotation speed is low and the load is high, only ignition timing spark advancing correction is carried out.

(4) In a low-speed, low-load operation region 5, where the engine rotation speed and load are both low, neither ignition timing spark advancing correction nor target equivalence ratio leaning correction is carried out.

Figure 6:
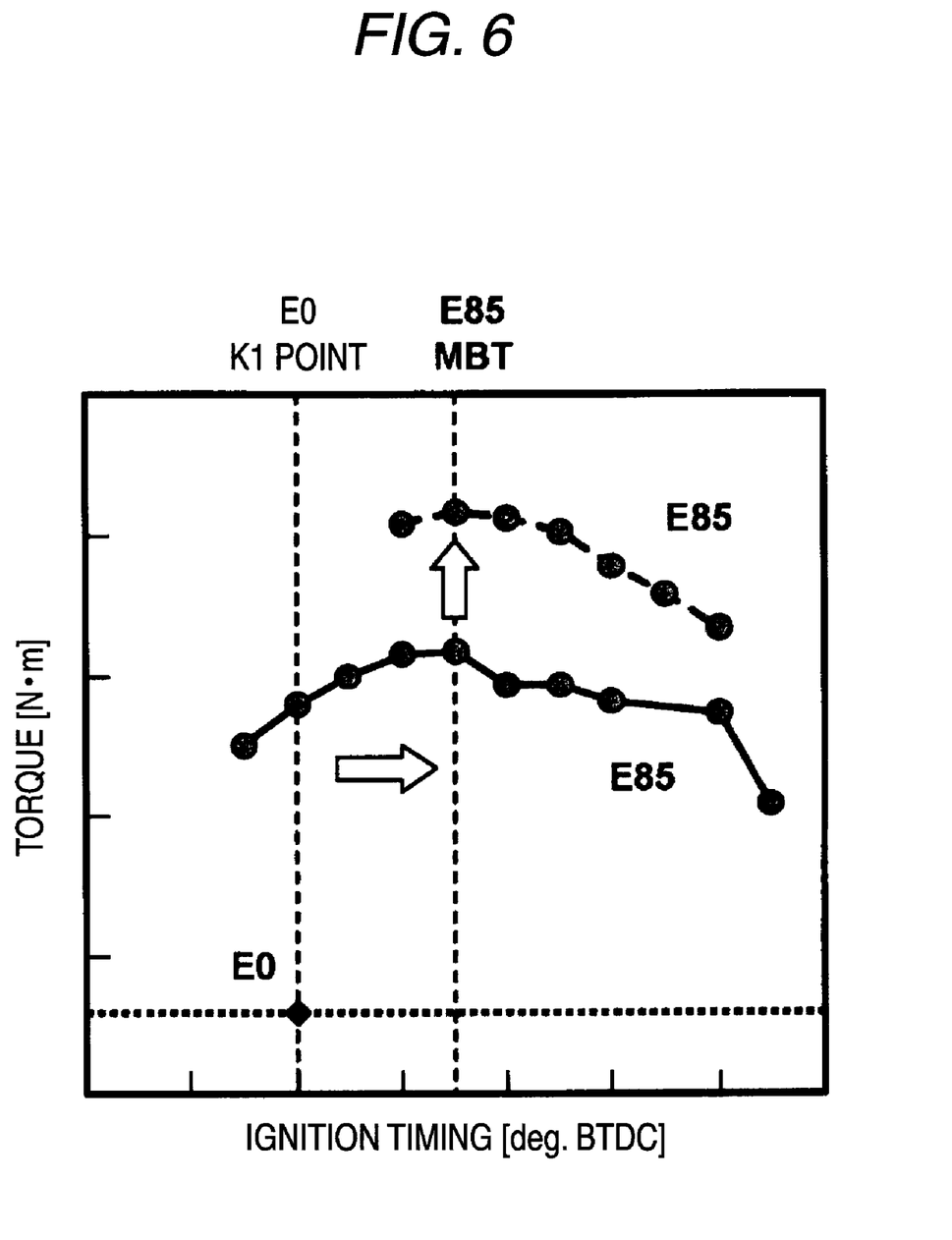
FIG. 6 is a graph of a relationship between ignition timing and torque.

Here, as can be understood from a graph of FIG. 6, indicating a relationship between the ignition timing and a torque, the optimal ignition timing (MBT) when the blended fuel (E85) is used is located more to the spark advance side than a knock point (K1 point: limit point of the ignition timing at which knocking does not occur) when the fuel (E0) is used. Also, the magnitude of the torque (solid line in the figure)

when the blended fuel (E85) is used is increased significantly in comparison to the torque at the K1 point when the fuel (E0) is used.

Figure 7:
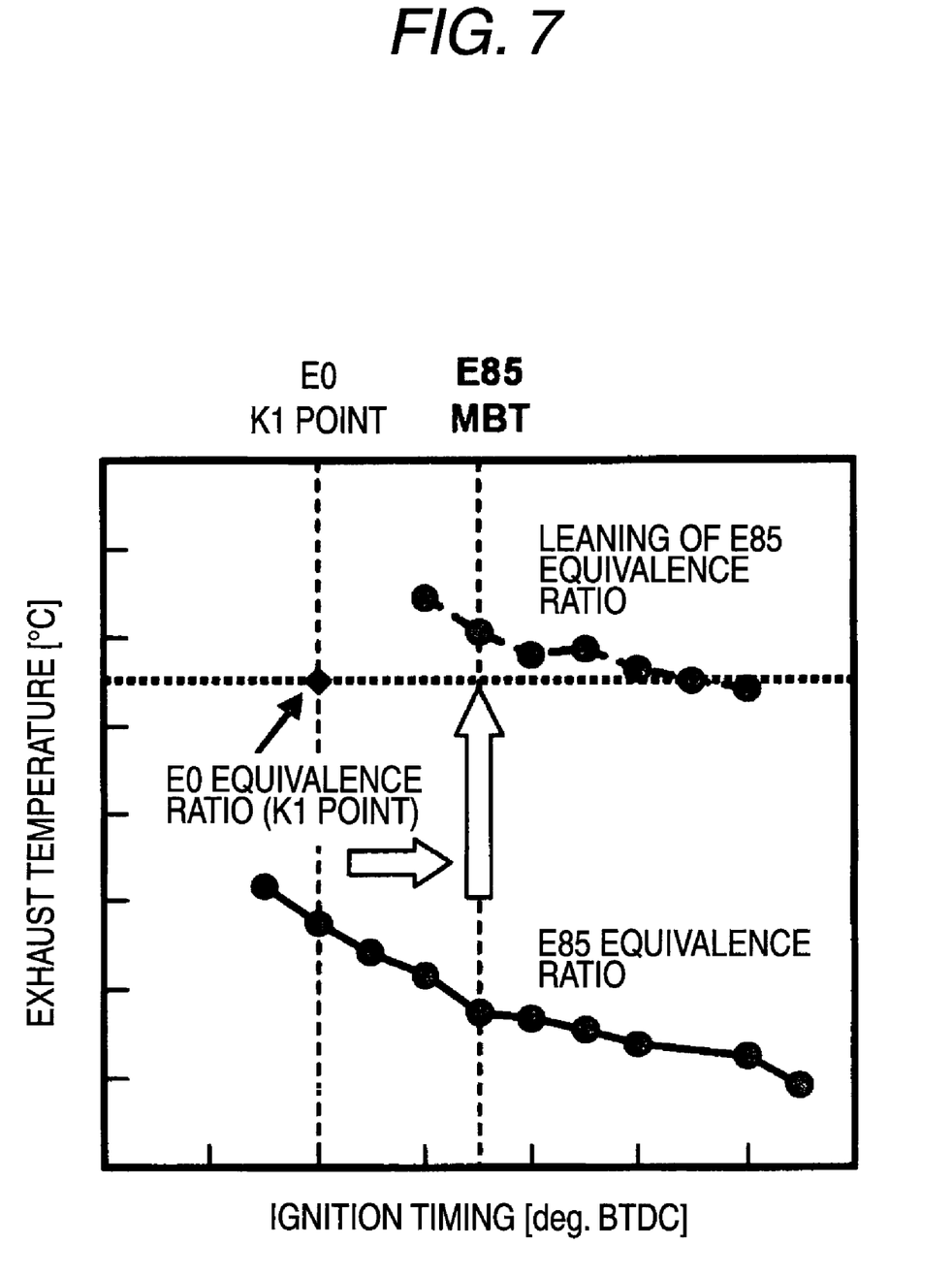
FIG. 7 is a graph of a relationship between ignition timing and exhaust temperature.

Also, as can be understood from a graph of FIG. 7, indicating a relationship between the ignition timing and the exhaust temperature, the exhaust temperature when the blended fuel (E85) is used, indicated by a solid line in the figure, is significantly lowered in comparison to the exhaust temperature at the K1 point when the fuel (E0) is used (and is lowered further by spark advancing of the ignition timing). By maintaining the exhaust temperature at a temperature lower than the exhaust temperature at the K1 point (limiting temperature), heat damage of the engine 11 can be prevented. Although the exhaust temperature is raised by leaning of the target equivalence ratio, when the blended fuel (E85) is used, the engine 11 is not damaged even when the target equivalence ratio is leaned as long as the exhaust temperature is within a range that does not practically exceed the limiting temperature as indicated by a dotted line in FIG. 7. Furthermore, by leaning of the target equivalence ratio, the torque is improved significantly as indicated by a dotted line in FIG. 6.

Figure 8:
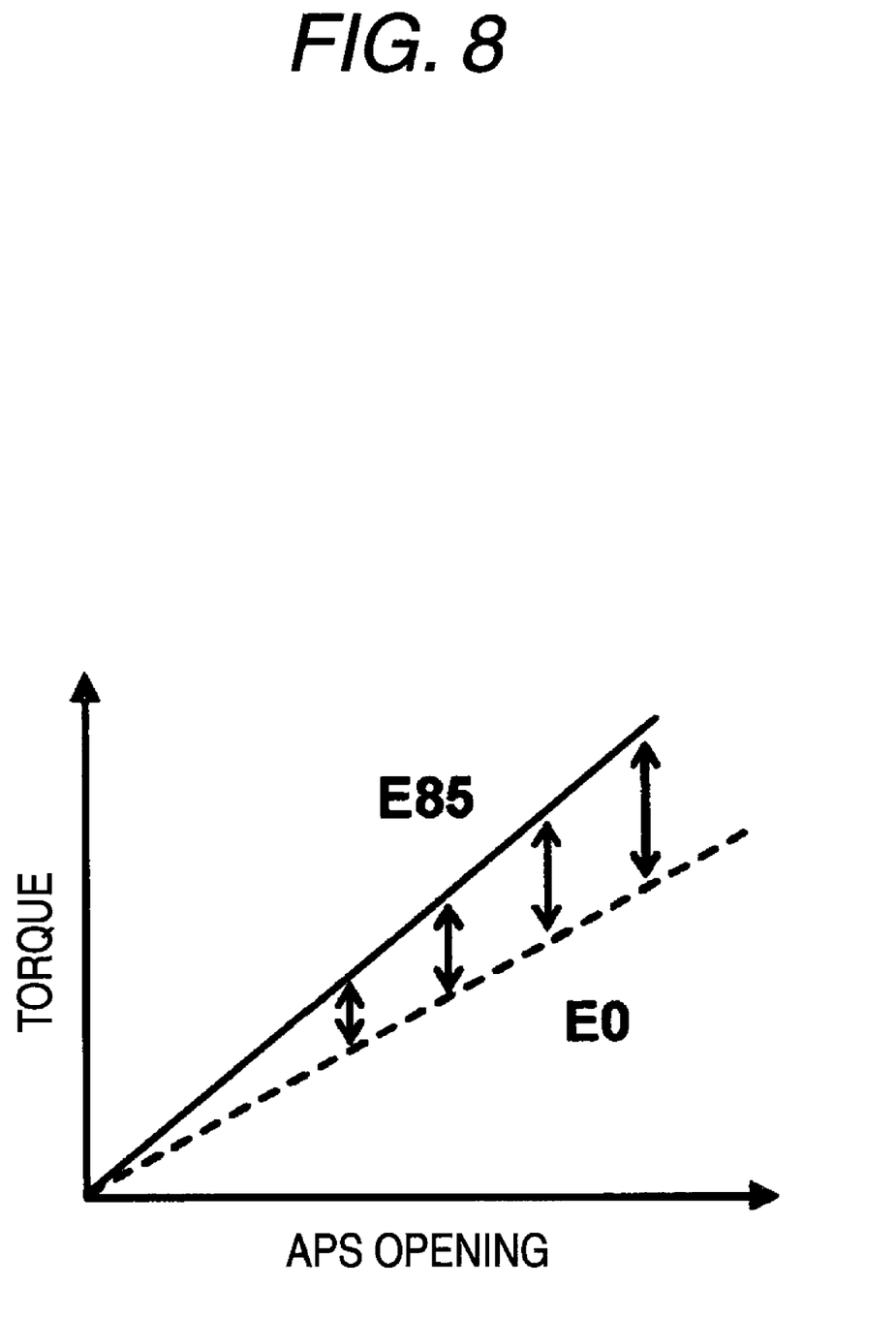
FIG. 8 is a graph of a relationship between APS opening and torque.

The opening of the throttle valve 31 is adjusted according to the opening of the accelerator pedal 41, and if accelerator-throttle characteristics stay the same regardless of the alcohol concentration of the blended fuel, a change of torque with respect to the opening of the accelerator pedal 41, detected by the accelerator position sensor (APS) 42, increases in slope as the alcohol concentration of the blended fuel become higher as shown in FIG. 8. That is, a proportion of the torque change is greater when the blended fuel (E85) is used than when the fuel (E0) is used. Thus, depending on the alcohol concentration of the blended fuel, drivability worsens to a level such that a driver feels uncomfortable.

Thus, with the present embodiment, after the target air-fuel ratio is leaned in step S4, switching of an accelerator-throttle conversion characteristic map is performed in step S6 according to the alcohol concentration in the blended fuel detected by the concentration detector to limit an increase amount of the opening of the throttle valve 31 more the higher the alcohol concentration in the blended fuel (throttle valve controller).

Figure 9:
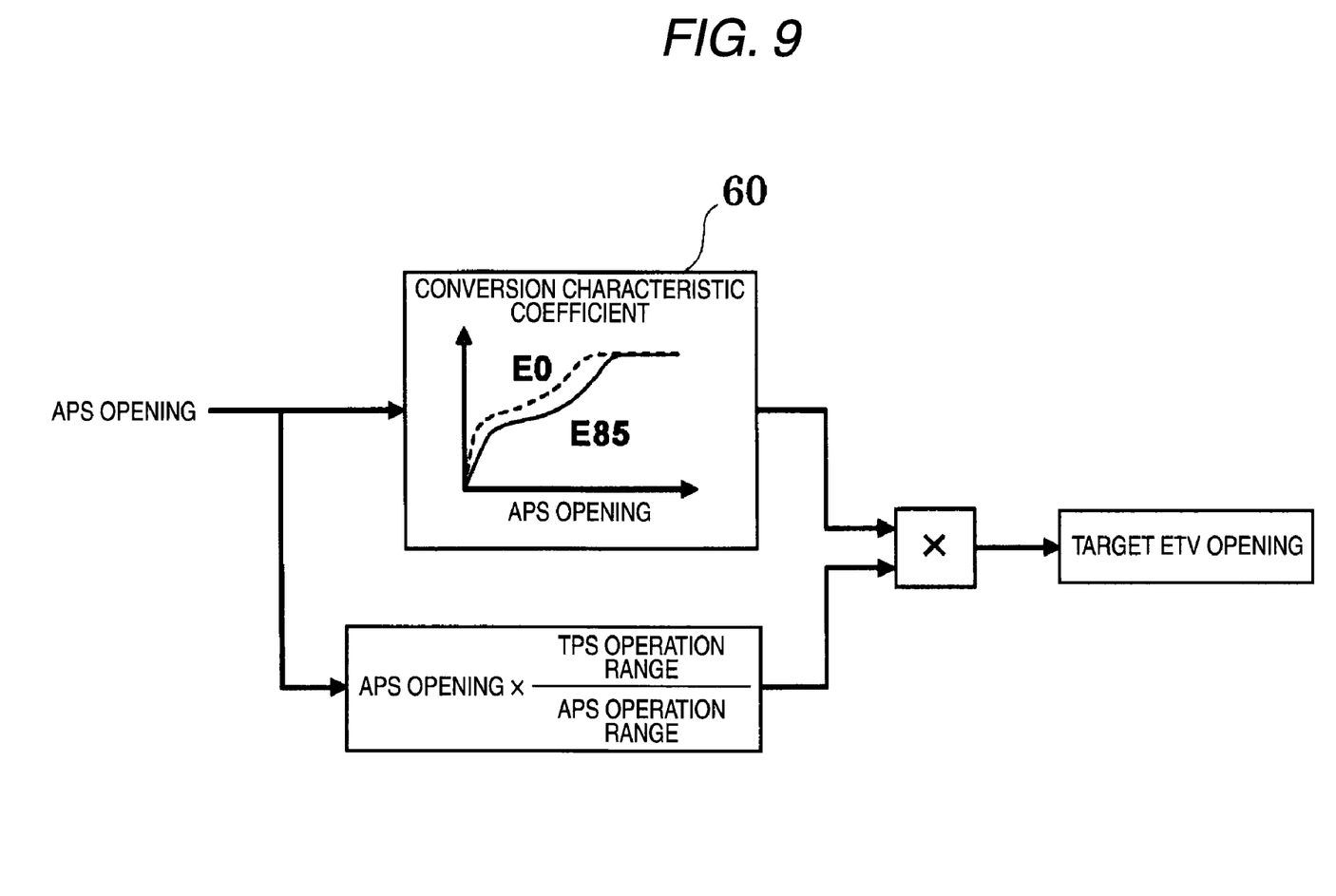
FIG. 9 is a schematic view for describing a target ETV opening calculating procedure.

Specifically, a plurality of accelerator-throttle conversion characteristic maps corresponding to the alcohol concentrations of blended fuels, that is, in the present embodiment, as shown in FIG. 9, a plurality of conversion characteristic coefficient maps 60 corresponding to the fuel (E0) and the blended fuel (E85) are provided and the conversion characteristic coefficient maps 60 are switched according to the alcohol concentrations of the blended fuels. By multiplying the accelerator opening (APS opening) by the conversion characteristic coefficient acquired from a map 60, a target throttle valve opening (target ETV opening) is calculated, and the opening of the throttle valve 31 is adjusted based on the calculated target ETV opening. By thus adjusting the opening of the throttle valve 31 according to the alcohol concentration of the blended fuel, for example, the opening of the throttle valve 31 when the blended fuel (E85) is used is made smaller than that when the fuel (E0) is used. The increase amount of the opening of the throttle valve 31 is thus more limited the higher the alcohol concentration in the blended fuel. Consequently, the intake air amount decreases, the torque is weakened, and an optimal torque corresponding to the accelerator opening is obtained.

In actually calculating the target opening of the throttle valve from the accelerator opening in the above manner, first, the acquired accelerator opening (APS opening) is converted to a corresponding value of the throttle valve opening (TPS opening). That is, the opening of the throttle valve 31 is calculated from the opening of the accelerator pedal 41. Specifically, by multiplying the APS opening by (TPS operation range/APS operation range), the acquired accelerator opening is converted to the corresponding value of the throttle valve opening.

Figure 10:
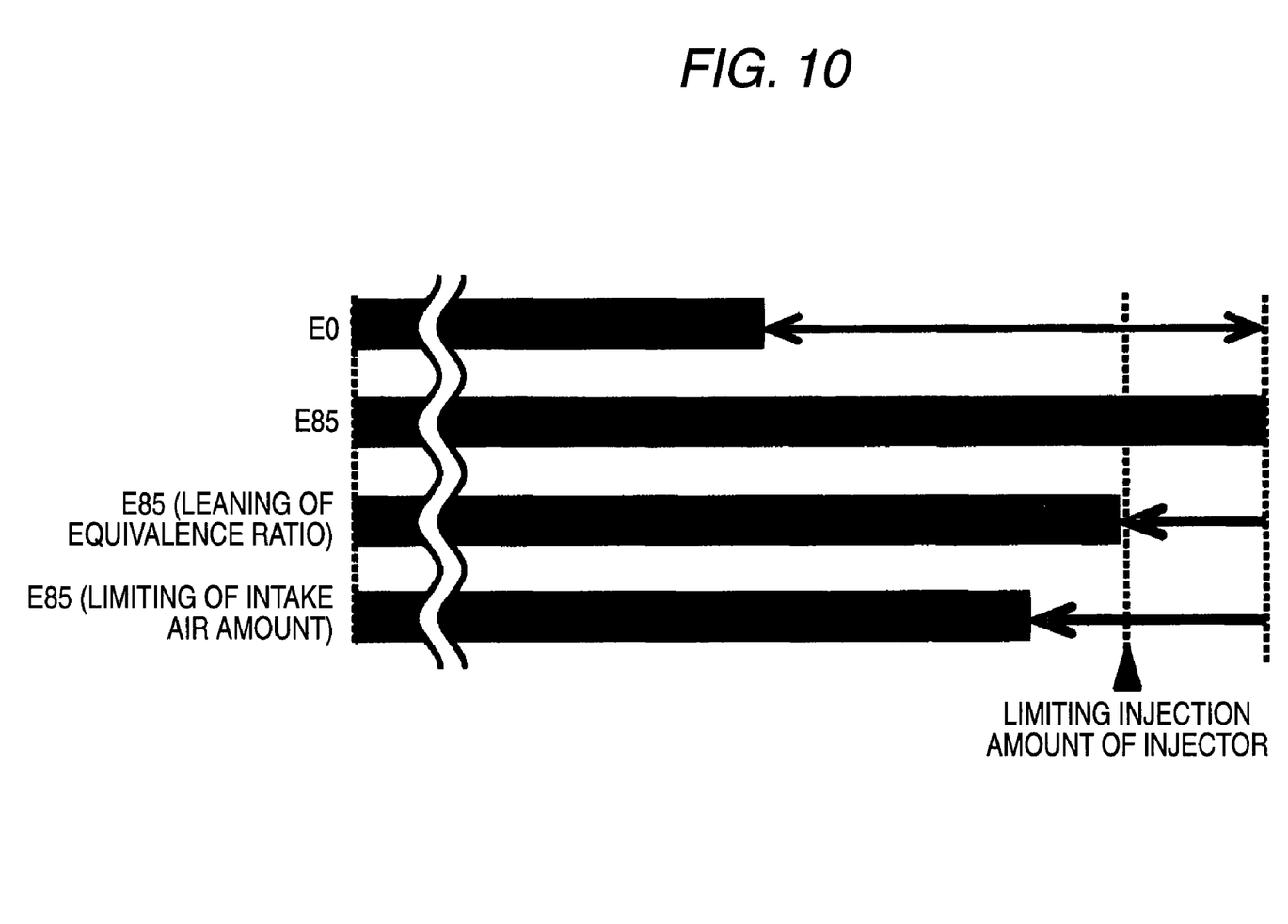
FIG. 10 is a graph showing differences in fuel injection amount from a fuel injection valve according to differences in fuel.

When an equivalence ratio substantially equal to that in the case of the fuel (E0) is to be obtained with the blended fuel (E85), etc., of comparatively high alcohol concentration, because the fuel injection amount of the fuel injection valve 23 must be multiplied by approximately 1.5 times, the desired equivalence ratio may not be obtained due to insufficiency of fuel injection amount from the fuel injection valve 23. For example, there may be a case where, as shown in FIG. 10, although a maximum injection amount in the case of use of the fuel (E0) is less than a limiting injection amount of the fuel injection valve (injector) 23, the limiting injection amount of the injector is exceeded when the blended fuel (E85) is used. This problem tends to occur especially readily when the operation state of the engine is a high-speed, high-load operation state (within the region α in FIG. 5).

However, with the present invention, because the target equivalence ratio is leaned according to the operation state of the engine and the alcohol concentration of the blended fuel, a demanded injection amount, demanded by the fuel injection valve 23, is decreased according to the leaning of the target equivalence ratio and is suppressed to no more than the limiting injector injection amount. Because there is thus no need to use a special fuel injection valve, etc., the blended fuel can be injected satisfactorily from the fuel injection valve 23 without increase in cost.

Furthermore with the present invention, because the intake air amount supplied to the combustion chamber 16 at a predetermined timing is limited as shall be described below, the demanded injection amount can be suppressed to be lower than the limiting injector injection amount more reliably.

Figure 11:
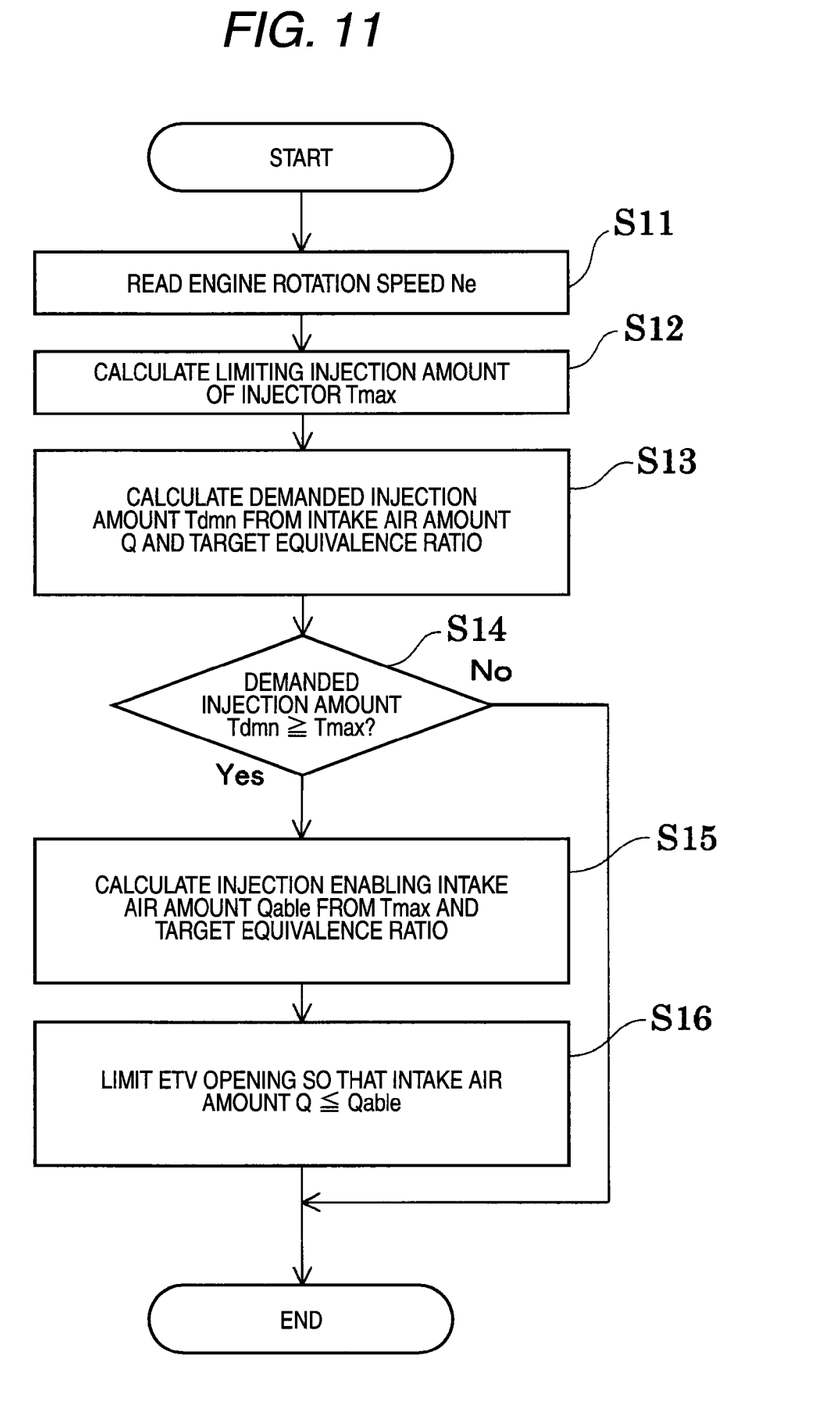
FIG. 11 is a flowchart of an example of a method of controlling an engine by means of the controller according to the present invention.

Specifically, first, as shown in FIG. 11, the operation state (engine rotation speed Ne) of the engine 11 is read in step S11. Then, in step S12, the limiting injection amount (Tmax) of the fuel injection valve 23 is calculated based on the detected rotation speed Ne (limiting injection amount calculator). Furthermore in step S13, the demanded injection amount (Tdmn), demanded by the fuel injection valve 23, is calculated from the intake air amount Q, acquired from the air flow sensor 33 which is an intake air detector, the alcohol concentration estimation value, and the above-described target equivalence ratio (demanded injection amount calculator). The limiting injection amount is determined from Formula (2), indicated below, and the demanded injection amount is determined from Formula (3), indicated below.

[Numerical Formula 2]

$$T\text{max} = 60/(Ne/2) - Td \quad (2)$$

Ne: engine rotation speed (rpm)  Td: dead time (seq)

[Numerical Formula 3]

$$Tdmn = \frac{(Q \times t)}{\sigma f \times ST_{alch}/\lambda \times G} \quad (3)$$

Q: intake air amount (g/sec)  t: time per stroke (sec)
σf: fuel density (g/cc)  λ: target equivalence ratio
STalch: stoichiometric air-fuel ratio according to alcohol concentration
G: injector gain (cc/sec)

Figure 12:
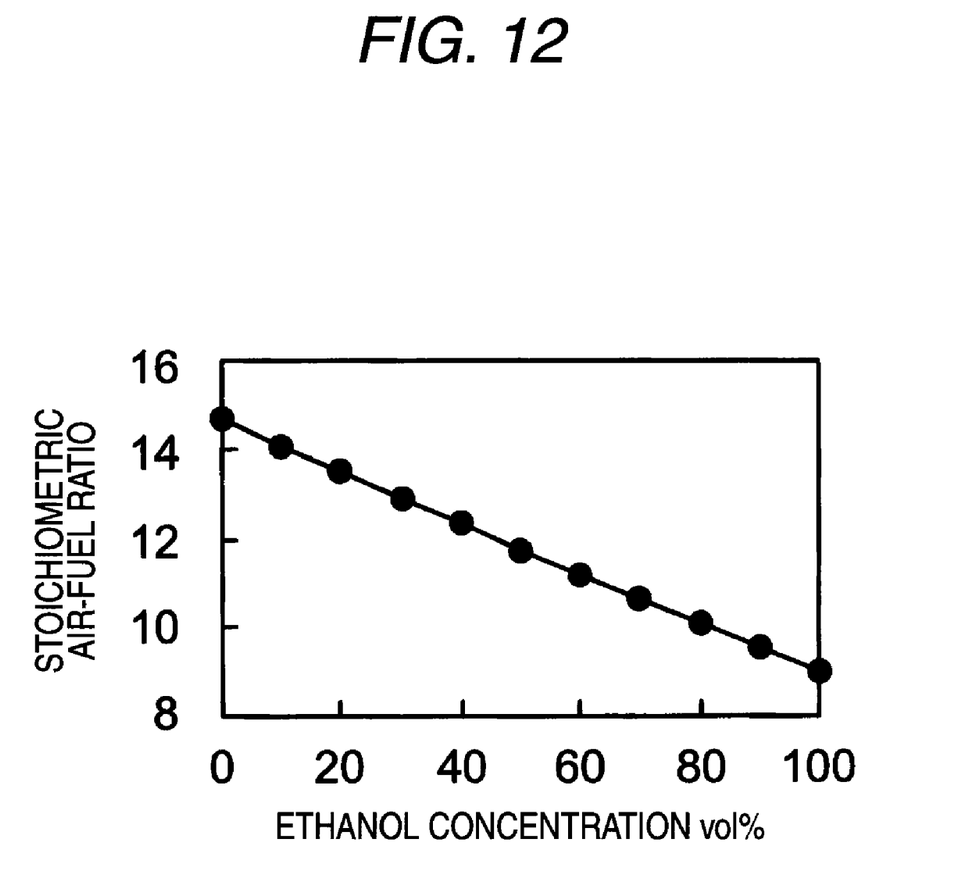
FIG. 12 is a graph of a relationship between alcohol concentration and stoichiometric air-fuel ratio.

The dead time Td is the time required principally for opening/closing of a needle constituting the fuel injection valve 23. The stoichiometric air-fuel ratio according to alcohol concentration STalch is determined from the alcohol concentration estimation value based on a map such as shown in FIG. 12.

Next, in step S14, it is determined whether or not the demanded injection amount (Tdmn) is no less than the limiting injection amount (Tmax) (step S14). If it is determined that the demanded injection amount (Tdmn) is no more than the limiting injection amount (Tmax) (step S14: No), that is, if it is determined that fuel of the demanded injection amount can be injected from the fuel injection valve 23, the process is ended because the subsequent control is not required.

If it is determined in step S14 that the demanded injection amount (Tdmn) is greater than the limiting injection amount (Tmax) (step S14: Yes), that is, if it is determined that fuel of the demanded injection amount cannot be injected by the fuel injection valve 23, an injection enabling intake air amount (Qable) is calculated from the limiting injection amount (Tmax), the alcohol concentration estimation value, and the target equivalence ratio in step S15. That is, in step S15, a limiting value of the opening of the throttle valve 31 is calculated from the limiting injection amount (Tmax), the stoichiometric air-fuel ratio in accordance with alcohol concentration (STalch), and the target equivalence ratio (limiting value calculator). The injection enabling intake air amount (Qable) is determined by Formula (4), indicated below, which is modified from Formula (3), indicated above.

[Numerical Formula 4]

$$Qable = Tmax \times \frac{\sigma f \times ST_{alch}/\lambda \times G}{t} \quad (4)$$

When the injection enabling intake air amount (Qable) is thus obtained, the opening of the throttle valve 31 is limited so that the intake air amount Q at the current point is no more than the injection enabling intake air amount (Qable) (limiter).

Because the demanded injection amount (Tdmn) is thus made no more than the limiting injection amount (Tmax), fuel of the demanded injection amount can be injected reliably from the fuel injection valve 23. The problem that the target equivalence ratio cannot be obtained due to insufficiency of injection amount from the fuel injection valve 23 thus does not occur.

Although this problem of insufficient injection amount can also be resolved, for example, by providing each cylinder with a plurality of fuel injection valves or employing a special fuel injection valve for a blended fuel, etc., significant increase in cost cannot be avoided by such means. Meanwhile, with the present invention, by limiting the opening of the throttle valve 31, the above problem can be resolved comparatively readily and without increase in cost.

Although an embodiment of the present invention has been described above, the present invention is not limited to this embodiment. For example, although with the above-described embodiment, a multi point injection engine was used as an example to describe the present invention, the present invention can obviously be employed in a cylinder injection engine or other type of engine.

According to an aspect of the invention, an output can be improved by adjusting the ignition timing appropriately according to the alcohol concentration. Also, by leaning of the blended fuel, a fuel consumption can be improved, and in leaning of a strongly rich state (equivalence ratio >approximately 1.1) to an output air-fuel ratio (equivalence ratio=approximately 1.1), the output can be improved. Although leaning of the blended fuel causes an exhaust temperature to rise, because the exhaust temperature decreases when the blended fuel is used, even if the exhaust temperature rises due to the leaning, the exhaust temperature is maintained at a temperature of a level that does not damage the engine. The output and the fuel consumption can thus be improved while preventing heat damage of the engine.

According to an aspect of the invention, because a correction item is changed appropriately according to the operation state, the output and the fuel consumption can be improved more reliably while preventing heat damage of the engine.

According to an aspect of the invention, because a correction item is changed appropriately according to the operation state, the output and the fuel consumption can be improved more reliably while preventing heat damage of the engine.

According to an aspect of the invention, because the demanded injection amount demanded of the fuel injection valve is reduced, insufficiency of injection amount from the fuel injection valve can be prevented and the target equivalence ratio can be obtained constantly regardless of the alcohol concentration of the blended fuel.

According to an aspect of the invention, the insufficiency of fuel injection amount from the fuel injection valve can be prevented more reliably.

According to an aspect of the invention, by the intake air amount being limited to no more than the limit value, the insufficiency of fuel injection amount from the fuel injection valve can be prevented even more reliably.

According to an aspect of the invention, by changing operation characteristics according to the alcohol concentration of the blended fuel, optimal drivability is obtained constantly.

According to an aspect of the invention, simplification of structure can be achieved in comparison to a case of using an alcohol concentration sensor, etc., to directly detect the alcohol concentration of the blended fuel and cost reduction can be achieved.

According to an aspect of the invention, an output and a fuel consumption of an engine can be improved while preventing heat damage of the engine when a blended fuel, with alcohol blended therein, is used. Even when a fuel injection valve for a gasoline engine is used in an engine using a blended fuel, an insufficiency of fuel injection amount can be prevented and a desired equivalence ratio can be obtained constantly. Furthermore, an optimal drivability is obtained constantly regardless of the alcohol concentration of the blended fuel.

FIG. 1

1 FUEL

2 INTAKE

3 EXHAUST

FIG. 2

S1 READ ENGINE ROTATION SPEED (Ne) AND ENGINE LOAD (Ec)

S2 READ ALCOHOL CONCENTRATION ESTIMATION VALUE

S3 CORRECT IGNITION TIMING TO SPARK ADVANCE SIDE ACCORDING TO ALCOHOL CONCENTRATION

S4 IS A/F CONTROL IN O/L MODE?

S5 CORRECT TARGET EQUIVALENCE RATIO IN LEAN DIRECTION ACCORDING TO ALCOHOL CONCENTRATION

S6 SWITCH ACCELERATOR-THROTTLE CONVERSION CHARACTERISTIC MAP ACCORDING TO ALCOHOL CONCENTRATION

FIG. 3

1 E0 IGNITION TIMING MAP

2 E85 IGNITION SPARK ADVANCE MAP

3 INTERPOLATION COEFFICIENT

4 ALCOHOL CONCENTRATION

5 IGNITION TIMING

FIG. 4

1 E0 target equivalence ratio map

2 E85 target equivalence ratio map

3 Interpolation coefficient

4 Alcohol concentration

5 Target equivalence ratio

FIG. 5

1 HIGH

2 LOAD

3 LOW

4 LOW

5 ROTATION SPEED

6 HIGH

FIG. 6

1 E0 K1 POINT

2 TORQUE [N·m]

3 IGNITION TIMING [deg. BTDC]

FIG. 7

1 E0 K1 POINT

2 EXHAUST TEMPERATURE [° C.]

3 IGNITION TIMING [deg. BTDC]

4 LEANING OF E85 EQUIVALENCE RATIO

5 E0 EQUIVALENCE RATIO (K1 POINT)

6 E85 EQUIVALENCE RATIO

FIG. 8

1 TORQUE

2 APS OPENING

FIG. 9

1 APS OPENING

2 CONVERSION CHARACTERISTIC COEFFICIENT

3 APS OPENING

4 APS OPENING

5 TPS OPERATION RANGE

6 APS OPERATION RANGE

7 TARGET ETV OPENING

FIG. 10

1 E85 (LEANING OF EQUIVALENCE RATIO)

2 E85 (LIMITING OF INTAKE AIR AMOUNT)

3 LIMITING INJECTION AMOUNT OF INJECTOR

FIG. 11

S11 READ ENGINE ROTATION SPEED Ne

S12 CALCULATE LIMITING INJECTION AMOUNT OF INJECTOR Tmax

S13 CALCULATE DEMANDED INJECTION AMOUNT Tdmn FROM INTAKE AIR AMOUNT Q AND TARGET EQUIVALENCE RATIO S14 DEMANDED INJECTION AMOUNT Tdmn≧Tmax?

S15 CALCULATE INJECTION ENABLING INTAKE AIR AMOUNT Qable FROM Tmax AND TARGET EQUIVALENCE RATIO S16 LIMIT ETV OPENING SO THAT INTAKE AIR AMOUNT Q≦Qable

FIG. 12

STOICHIOMETRIC AIR-FUEL RATIO

ETHANOL CONCENTRATION vol %

What is claimed is:

1. A controller of an engine that can use a blended fuel with alcohol blended therein, the controller comprising:
an ignition timing controller, operable to control an ignition timing of the engine;
an exhaust air-fuel ratio detector, operable to detect an exhaust air-fuel ratio of the engine;
a concentration detector, operable to detect concentration of the alcohol in the blended fuel;
an operation state detector, operable to detect an operation state of the engine; and
a corrector, when the operation state which is detected by the operation state detector is a high-speed, high-load operation state, as the concentration of the alcohol which is detected by the concentration detector is higher,
operable to control an injection amount which is injected from a fuel injection valve to correct a target equivalence ratio more in a lean direction, and
operable to correct the ignition timing which is controlled by the ignition timing controller more to a spark advance side.

2. The controller according to claim 1, wherein
when the operation state which is detected by the operation state detector is a high-speed, low-load operation state, as the concentration of the alcohol which is detected by the concentration detector is higher, the corrector corrects the target equivalence ratio more in the lean direction.

3. The controller according to claim 1, wherein
when the operation state which is detected by the operation state detector is a low-speed, high-load operation state, as the concentration of the alcohol which is detected by the concentration detector is higher, the corrector corrects the ignition timing more to the spark advance side.

4. The controller according to claim 1, further comprising:
a limiter, when a demanded injection amount necessary for obtaining the target equivalence ratio is greater than a limiting injection amount of the fuel injection valve, operable to limit an opening of a throttle valve which is provided in an air intake system of the engine to a limit value.

5. The controller according to claim 4, further comprising:
an intake air amount detector, operable to detect an intake air amount of the engine;
a limiting injection amount calculator, operable to calculate the limiting injection amount based on the operation state which is detected by the operation state detector; and
a demanded injection amount calculator, operable to calculate the demanded injection amount based on the intake amount which is detected by the intake air amount detector, the concentration of the alcohol which is detected by the concentration detector, and the target equivalence ratio.

6. The controller according to claim 5, further comprising:
a limit value calculator, operable to calculate the limit value based on the limiting injection amount which is calculated by the limiting injection amount calculator, the concentration of the alcohol which is detected by the concentration detector, and the target equivalence ratio.

7. The controller according to claim 4, further comprising:
an accelerator pedal opening detector, operable to detect an opening of an accelerator pedal; and
a throttle valve controller, operable to control the throttle valve in accordance with the opening of the accelerator pedal, wherein
as the concentration of the alcohol which is detected by the concentration detector is higher, the throttle valve controller limits an increase amount of the opening of the throttle valve more.

8. The controller according to claim 1, wherein
the concentration detector detects the concentration of the alcohol in the blended fuel based on the exhaust air-fuel ratio which is detected by the exhaust air-fuel ratio detector.

* * * * *